United States Patent
Manway

[11] Patent Number: 5,813,474
[45] Date of Patent: Sep. 29, 1998

[54] PLOW BLADE

[75] Inventor: Terry A. Manway, Monroeville, Pa.

[73] Assignee: Kennametal Inc., Latrobe, Pa.

[21] Appl. No.: 937,226

[22] Filed: Sep. 11, 1997

Related U.S. Application Data

[63] Continuation of Ser. No. 653,167, May 24, 1996, abandoned.

[51] Int. Cl.⁶ ..................................................... E02F 3/815
[52] U.S. Cl. ......................... 172/701.3; 172/777; 37/460
[58] Field of Search ............................. 37/266, 460, 461, 37/465, 446, 447, 448, 450, 452; 172/701.1, 701.2, 701.3, 747, 713, 766, 777

[56] References Cited

U.S. PATENT DOCUMENTS

| | | | |
|---|---|---|---|
| 3,312,504 | 4/1967 | Mäkinen | 172/777 X |
| 3,385,385 | 5/1968 | Kucera et al. | 299/111 X |
| 3,520,076 | 7/1970 | Nichols | 172/777 X |
| 3,529,677 | 9/1970 | Stephenson | 172/767 |
| 3,882,594 | 5/1975 | Jackson et al. | 172/719 X |
| 3,888,027 | 6/1975 | Toews | 37/141 |
| 3,934,654 | 1/1976 | Stephenson et al. | 172/719 |
| 4,101,318 | 7/1978 | Rudy | 75/240 |
| 4,216,832 | 8/1980 | Stephenson et al. | 172/540 |
| 4,450,635 | 5/1984 | Shwayder | 37/271 |
| 4,711,503 | 12/1987 | Berchem et al. | 299/79 |
| 4,715,450 | 12/1987 | Hallissy et al. | 172/701.3 |
| 4,753,299 | 6/1988 | Meyers | 37/460 X |
| 4,770,253 | 9/1988 | Hallissy et al. | 172/701.3 |
| 4,883,129 | 11/1989 | Lonn et al. | 37/460 X |
| 5,054,217 | 10/1991 | Nilsson et al. | 37/244 |
| 5,067,262 | 11/1991 | Stiffler et al. | 37/142 R |
| 5,129,168 | 7/1992 | Hedley | 37/141 R |
| 5,314,029 | 5/1994 | Rowlett | 172/699 |

FOREIGN PATENT DOCUMENTS

| | | |
|---|---|---|
| 0284582 | 9/1988 | European Pat. Off. . |
| 3531787 | 6/1986 | Germany . |
| 453230 | 8/1967 | Switzerland . |
| 453230 | 6/1968 | Switzerland . |
| 550897 | 6/1974 | Switzerland . |
| 2146058 | 4/1985 | United Kingdom ..................... 299/86 |
| WO 9325065 | 12/1993 | WIPO . |

OTHER PUBLICATIONS

Flyer–Advertisement, "We haven't had to replace a Kennametal snowplow blade in 9 years," Kennametal Inc., AM89–60 (1989).
Flyer–Advertisement, "Co$t Cutter$," Kennametal Inc., AM92–10 (1992).
Brochure, "Kennametal dual–carbide–insert grader blades," Kennametal Inc., AM95–3(3)A5 (1995).
Brochure, "Kennametal snowplow blades and accessories," Kennametal Inc., AM95–17(5)F5 (1995).
PCT Search Report mailed 27 Aug. 1997, International Application No. PCT/US97/04276, International Filing Date 19 Mar. 1997.

*Primary Examiner*—Michael J. Carone
*Assistant Examiner*—Robert Pezzuto
*Attorney, Agent, or Firm*—John J. Prizzi

[57] ABSTRACT

The plow blade comprising support member, a blade edge being mounted to the support member and having one or more insert holes, and one or more blade inserts having a wear portion, the one or more blade inserts being mounted within the one or more insert holes of the blade edge such that the wear portion protrudes to some extent from the one or more insert holes.

20 Claims, 1 Drawing Sheet

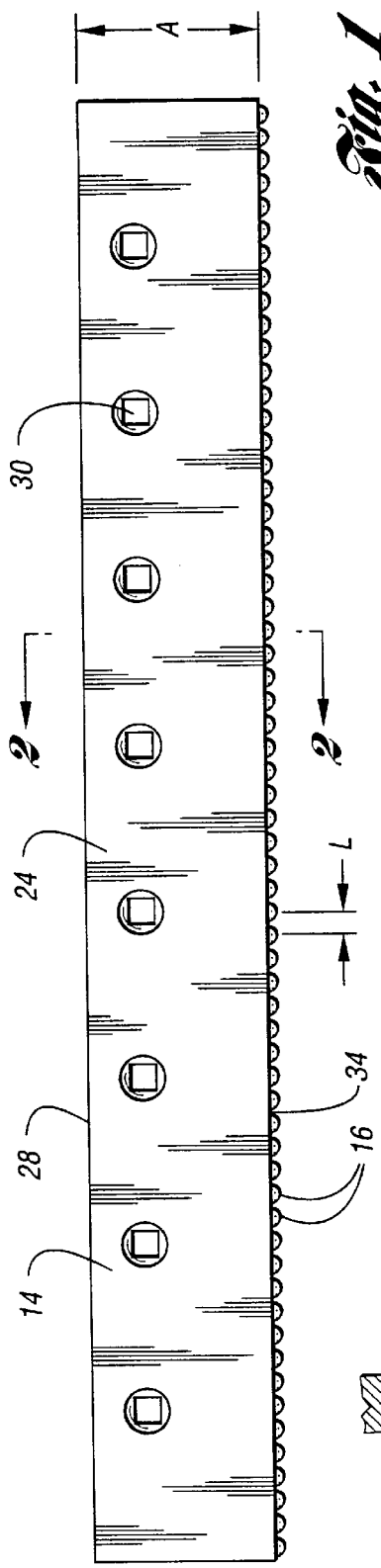
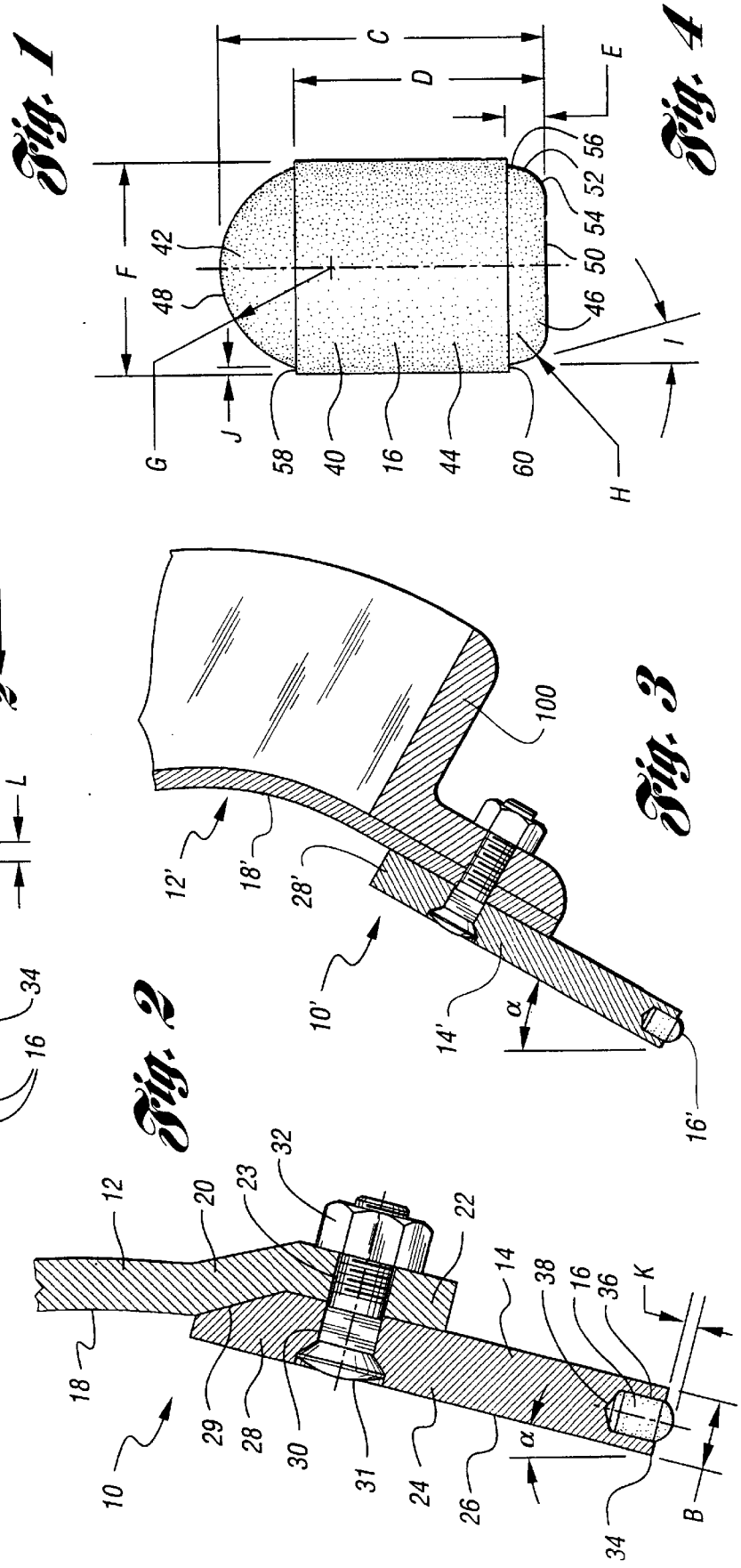

PLOW BLADE

This application is a continuation of application Ser. No. 08/653,167 filed on May 24, 1996, now abandoned.

TECHNICAL FIELD

This invention relates to plow blades for snow plows, earth working devices, and the like, and more particularly to a plow blade having carbide inserts along the bottom forward edge of the plow blade for improved impact and wear resistance.

BACKGROUND ART

Plow blades for snow removal or earth working are well known. Such plow blades typically include a fairly long support member, also referred to as a mold board, which is usually made from steel. Such support members are typically concave on the forward side and adapted for mounting beneath or in front of a power device, such as a truck or tractor. Such plow blades also typically include a detachable edge which may be attached, typically by bolting, to the lower edge of the support member so as to project downwardly from the support member. Such blade edges normally withstand most of the impact and abrasive wear to which the plow blade is subjected and as a result are typically made from a quality grade of steel.

Because blade edges are subjected to abrasive wear and impact damage, the wear rate can be extremely high at times. When a blade edge wears down beyond a predetermined point, it must be replaced with another blade edge. The replacement of blade edges, is, of course, time consuming, represents down time for the equipment, and requires the maintenance of a replacement parts inventory. If a worn blade edge is not replaced, wear at the lower edge of the blade edge would continue until the support member suffers damage by exposure to the surface being worked on.

Thus, over the years, steel blade edges having cemented wear resistant hard metal carbide block inserts distributed along the lower edge of the blade edge have been employed in an attempt to prolong the life of the blade edge. Such insert blocks are typically brazed adjacent to each other along the lower edge of the blade edge. Examples of such inserts are disclosed in U.S. patents to Stephenson et al. (U.S. Pat. No. 3,934,654) and Stephenson (U.S. Pat. No. 3,529,677).

These prior art blades operate fairly well under the operating conditions for which they were designed. However, the use of protruding lane marker reflectors on highways has grown significantly in popularity over recent years. These lane markers are typically attached to the road surface and extend slightly above the road surface. While these reflectors greatly improve lane visibility, they present a problem when the road must be plowed. When typical prior art carbide block inserts within prior art blade edges impact the reflector lane markers, the carbide block inserts, which are more susceptible to impact damage than steel, are sometimes damaged. Furthermore, because such prior art carbide block inserts are typically brazed adjacent to each other, carbide inserts adjacent to the damaged insert are susceptible to crack propagation damage.

The same type of damage may also occur when such typical prior art carbide block inserts strike irregularities in the road surface, such as potholes or ruts. Even well maintained roads in urban environments contain many obstructions, such as manhole covers and sewer grates, which can damage blades containing carbide block inserts.

In an effort to prevent such damage, and to also reduce erosion of the steel surrounding the carbide block inserts, a cover blade is sometimes employed. A cover blade is typically a steel plate bolted onto the front surface of the blade edge so as to absorb most shock loading and face wear. An example of such a cover blade is disclosed in U.S. Pat. No. 3,888,027 to Toews.

A problem with using such a cover blade is that the cover blade is unprotected by the carbide block inserts. Accordingly, the cover blade is subjected to wear and impact damage and may wear down relatively quickly. When the cover blade wears down to a predetermined point, it must be replaced. This, of course, represents down time for the equipment and requires the maintenance of a replacement inventory of cover blades.

SUMMARY OF THE INVENTION

An object of the present invention is to provide an improved plow blade. The improved plow blade of this invention comprises a support member, a blade edge having one or more insert holes which is mounted to the support member, and one or more blade inserts having a wear portion being mounted within the one or more insert holes of the blade edge such that the wear portion protrudes to some extent from the one or more insert holes.

In an alternative embodiment, the improved plow blade of this invention comprises a support member, a blade edge mounted to the support member, and one or more blade inserts having a wear portion, the wear portion having a convex curved wear surface, and the one or more blade inserts being mounted along the blade edge such that the wear portion will contact the surface being worked upon.

An objective of another alternative embodiment is to provide an improved blade edge for mounting onto a support member. The improved blade edge comprises an edge body having a lower edge and one or more insert holes along the lower edge. One or more blade inserts having a wear portion are then mounted within the one or more insert holes of the blade edge such that the wear portion protrudes to some extent from the one or more insert holes.

In yet another alternative embodiment, the improved blade edge comprises an edge body having a lower edge and one or more blade inserts having a wear portion, the wear portion having a convex curved wear surface, and the one or more blade inserts being mounted along the lower edge such that the wear portion will contact the surface being worked upon.

In each of the above-described embodiments, it is preferable that each of the one or more blade inserts mounted within the one or more insert holes are spaced apart so as to be in a non-contacting relationship with any other blade insert mounted within the one or more insert holes.

In each of the above-described embodiments, it is also preferable that the wear portion of each blade insert have a convex curved wear surface. In a more specific embodiment, the wear surface may have a sphere section configuration. Also, the one or more blade inserts may have an intermediate portion adjoining the wear portion and a seating end adjoining the intermediate portion. The intermediate portion may have a cylindrical configuration having an intermediate portion diameter and the seating end may have a flat seat surface joined to the intermediate portion via a curved shoulder. In such case, the one or more insert holes may have a cylindrical configuration and an insert hole diameter slightly greater than the intermediate portion diameter.

One advantage of this invention is that the wear portion having a wear surface defined by a convex curved surface is more resistant to impact damage.

Furthermore, because the inserts are preferably spaced apart from one another, impact damage to any one insert will not lead to the propagation of that impact damage to other inserts.

Yet another advantage of this invention is that it allows the plow blade to be used more flexibly. In prior art designs, the blade edge of the plow blade must be kept at a certain angle a with respect to a normal to the surface being worked upon, typically from 15° to 20°, in order to be effective. With the present invention, because the wear portion has a wear surface defining a convex curve, the angle α of the blade edge to the normal to the surface being worked upon may be varied beyond the above 5° range. This is especially advantageous if the power device, such as a truck or tractor, to which the plow blade is attached is constructed in such a way that prevents the plow blade from being used at a specific optimal angle of attack.

Further objects and advantages of this invention will be apparent from the following description, reference being had to the accompanying drawings wherein various embodiments of the present invention are clearly shown.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 1 is an elevation view of a blade edge constructed according to the present invention;

FIG. 2 is a vertical section taken along line 2—2 of FIG. 1, and including a portion of a support member not shown in FIG. 1;

FIG. 3 is a vertical section taken along line 2—2 of FIG. 1, showing an alternative embodiment of a blade edge, and including a portion of a support member not shown in FIG. 1; and FIG. 4 is an elevational view of a carbide insert for mounting in the lower edge of the blade edge.

BEST MODE FOR CARRYING OUT THE INVENTION

One embodiment of the plow blade invention is shown in FIGS. 1, 2, and 4. The plow blade 10 includes a support member 12, a blade edge 14, and blade inserts 16.

The support member 12, or mold board, having a member front surface 18 may be up to 18 feet long or longer and can be mounted beneath or in front of a power device such as a truck or tractor. The configuration of the front surface 18 of the support member 12 may be concave as shown in FIG. 2, flat, partially flat and partially concave, or may have any other suitable or desired configuration. In this embodiment, the lower end of the support member 12 has an inclined offset 20 and a straight terminal portion 22. The straight terminal portion 22 includes connection holes which in this case are bolt holes 23.

The support member 12 is typically mounted so that the length of the support member 12 is generally parallel to the surface being worked on and is typically moved along the surface being worked on in a direction generally perpendicular to the length of the support member 12. Additionally, the support member 12 is typically mounted such that it can be raised and lowered relative to the surface and tilted relative to the surface in the fore and aft direction and also in the lateral direction.

As shown in FIGS. 1 and 2, the plow blade edge 14 of this embodiment consists of an edge body 24 having an edge front surface 26 and an upper end 28 shaped to conform to the contour of the inclined offset 20 and terminal portion 22 of the support member 12 on the member front surface 18 of the support member 12. The upper end 28 of the edge body 24 is shaped to conform in this embodiment by including a chamfer 29. The plow blade edge 14 of this embodiment also includes connection holes which in this case are bolt holes 30 configured so as to receive bolts as explained in the following paragraph.

As shown in FIG. 2, bolts 31 and nuts 32 may be used to detachably secure the blade edge 14 to the support member 12. While any suitable bolts may be used, the bolts 31 may be in the form of plow bolts as shown in FIG. 2 so that the heads are substantially flush with the working side of the blade and provide substantially no obstruction to the sliding of material over the edge front surface 26 of the blade edge 14. The use and spacing of such bolts 31, such as Grade 8, Number 3 head plow bolts with self-locking nuts, are generally known in the art and will not be discussed in further detail here.

The edge body 24 of the blade edge 14 also has a lower edge 34 which, in this embodiment, defines insert holes 36. While the insert holes 36 may have any suitable configuration, the insert holes 36 in this embodiment have a cylindrical configuration. Such insert holes 36 may be made by drilling or any other appropriate method. In the embodiment shown, the insert holes 36 have a hole bottom 38 which has a drill point configuration resulting from the use of a drill.

The blade edge 14 may be made from any appropriate material, such as AISI 1020 to 1035 grade steel. A blade edge 14 having a height "A" of 5" or greater and a thickness "B" of 0.88" or greater is believed to be suitable. Such blade edges 14 are typically supplied in 3' to 4' long increments so that a user need only replace a worn increment instead of a blade edge 14 having a length equal to the support member 12.

As best shown in FIG. 4, the blade inserts 16 in this embodiment have an insert body 40. In this embodiment, the insert body 40 has a wear portion 42, an intermediate portion 44 adjoining the wear portion 42 and a seating end 46 adjoining the intermediate portion 44. The wear portion 42 in the embodiment shown has a wear surface 48 which can have any suitable configuration but which is preferably a convex curved surface. In this embodiment, the convex curved surface is a sphere section. While not shown, the wear surface 48 having a convex curved surface could alternatively constitute a paraboloid, an ellipsoid, a cylinder side section, or any other suitable convex curved surface whether symmetrical or asymmetrical or otherwise. In this embodiment, the intermediate portion 44 has a cylindrical configuration, and the seating portion 46 has a flat seat surface 50 joined to the intermediate portion 44 via a curved shoulder 52. As shown in FIG. 4, the curved shoulder 52 in this embodiment has a radiused portion 54 having the radius "H" and a straight portion 56 set at an angle "I" to the side of the intermediate portion 44.

The blade inserts 16 may be made from any suitable or desired material. A cemented metal carbide, such as tungsten carbide of a tough grade used in prior art blade designs, e.g. K3030C, is believed to be suitable for this purpose. More specifically, the inserts 16 are believed suitable if made from a high shock WC grade of tungsten carbide having an 11% to 12½% cobalt content, a density of 14.1 minimum to 14.6 maximum, a hardness of 87.5 minimum to 89.0 maximum Rc "A" scale, a transverse rupture strength of 350,000 p.s.i. minimum, and a porosity of A06, B00, and C00 based on testing in accordance with ASTM designation B276-79.

In the embodiment shown, the blade inserts 16 have a wear step 58 and an end step 60 resulting from compacting and cementing the powdered metal carbide during the manufacturing process. Each of the wear step 58 and end step 60 has a dimension of "I".

The blade inserts 16 may be mounted within the insert holes 36 by using any suitable method such as brazing or press fitting. From a manufacturing standpoint, it is economically preferable to braze the blade inserts 16 within the insert holes 36 because press fitting would require some finish grinding of the cylindrical surface of the intermediate portion 44 of the inserts 16 and a stricter tolerance requirement with regard to the diameter of the insert holes 36. When brazing is used, the inserts 16 need not be ground following manufacture. In such case, the inserts 16 should be brazed on all sides consistent with sound brazing practice and without evidence of voids.

While any suitable brazing material may be used it is preferred that the brazing material be a high strength alloy type having a shear strength noted by the manufacturer of 30,000 p.s.i. minimum. Because suitable brazing materials are known in the art, they will not be discussed in further detail here.

As shown in FIG. 3, an insert 16 having the following approximate dimensions is believed to be suitable.

| | |
|---|---|
| C | 0.750" |
| D | 0.575" |
| E | 0.093" |
| F | 0.525" |
| G | 0.266" |
| H | 0.080" |
| I | 15° |
| J | 0.006 |

In conjunction with an insert 16 having such dimensions an insert hole 36 formed by using a 0.533/0.537 diameter drill×0.58" deep, with an 118° standard drill point bottom, is believed to be suitable. In this embodiment, and as shown in FIG. 2, the insert 16 will then protrude a distance "K" of approximately 0.125".

As shown in FIG. 1, a plurality of blade inserts 16 are arranged along the lower edge 34 of the blade edge 14. For blade inserts 16 having the dimensions set forth, a spacing "L" of 0.666" to 0.75" between the inserts 16 from center to center is believed to be suitable. These dimensions provide a thickness of steel between the inserts 16 of about 0.14" to 0.225".

An alternative embodiment is shown in FIG. 3. In this embodiment, the support member 12', or mold board, includes at the bottom a reinforcing angle member 100. The configuration of the front surface 18' of the support member 12' may be concave with a flat lower portion as shown in FIG. 3, wholly flat, or may have any other suitable or desired configuration.

The blade edge 14' and blade inserts 16' of this embodiment are identical to those of the embodiment shown in FIGS. 1, 2 and 3, with the exception that the upper end 20' of the blade edge 14' need not include a chamfer or otherwise be shaped to conform to the adjacent front surface 18' of the support member 12' which, in this case, is flat.

One advantage of this invention is that the novel geometry of the insert 16 is more resistant to impact damage. More specifically, the wear portion 42 having a wear surface 48 defined by a convex curved surface is more resistent to impact damage.

Furthermore, because the inserts 16 are spaced apart from one another along the lower edge 34 of the blade edge 14, and are separated by the material from which the blade edge is made, impact damage such as cracking to any one insert 16 will not lead to the propagation of that impact damage to other inserts 16.

Yet another advantage of this invention is that it may be used more flexibly. In prior art designs, the blade edge of the plow blade must be kept at a certain angle with respect to the surface being worked upon. For example, in many prior art designs, the blade edge should be held at a specific angle α to a normal to the road surface varying anywhere from 15° to 20° typically. In the present invention, and especially with regard to the embodiments shown, because the wear portion 42 has a wear surface 48 defining a sphere section, the angle α of the blade edge 14 may be varied beyond the above range. For example, a range of angle α from 0° to about 65° may be used. Of course, many other convex curved surfaces, such as that defined by a cylinder side section, a paraboloid, ellipsoid, or otherwise, would also offer the same advantage.

While particular embodiments of the invention have been illustrated and described, it will be obvious to those skilled in the art that various changes and modifications may be made without departing from this invention. It is intended that the following claims cover all such modifications and all equivalents that fall within the spirit of this invention.

All patents and patent applications cited herein are hereby incorporated by reference in their entirety.

What is claimed is:

1. A snowplow blade for removing snow from a surface, the snowplow blade comprising:

an elongated support member having a support member length;

a blade edge detachably mounted to the support member and said blade edge having a blade edge body with a blade edge length, a blade edge height and a blade edge thickness, wherein the blade edge length is greater than the blade edge height and the blade edge thickness; wherein the blade edge length extends in the direction of the support member length; said blade edge having a lower edge defined by said blade edge length and said blade edge thickness; and said lower blade edge having first and second insert holes therein distributed along the blade edge length;

first and second blade inserts, each having a wear portion, the wear portion having a convex curved wear surface, the first and second blade inserts being brazed into the first and second insert holes along the lower edge such that the wear portion will contact the surface from which the snow is to be removed;

wherein each of the first and second blade inserts are spaced apart so as to be in a non-contacting relationship with each other.

2. The snowplow blade of claim 1 wherein the wear surface has a sphere section configuration.

3. A blade edge for detachably mounting onto an elongated support member having a support member length, the blade edge comprising:

an edge body having a blade edge length, a blade edge height and a blade edge thickness, wherein the blade edge length is greater than the blade edge height and the blade edge thickness; wherein the blade edge length extends in the direction of the support member length when detachably mounted on the support member; said blade edge having a lower edge defined by said blade edge length and said blade edge thickness; and said lower blade edge having a plurality of insert holes therein distributed along the blade edge length;

a plurality of blade inserts having a wear portion and being mounted within the plurality of insert holes of the blade edge such that the wear portion protrudes to some extent from the plurality of insert holes and wherein said plurality of blade inserts consists essentially of a cemented metal carbide;

wherein each of the plurality of blade inserts mounted within the plurality of insert holes are spaced apart so as to be in a non-contacting relationship with any other blade insert mounted within the plurality of insert holes.

4. The blade edge of claim 3 wherein the wear portion has a convex curved wear surface.

5. The blade edge of claim 3 wherein the wear surface has a sphere section configuration.

6. The blade edge of claim 3 wherein the intermediate portion has a cylindrical configuration having an intermediate portion diameter, the seating end has a flat seat surface joined to the intermediate portion via a curved shoulder, and the wear portion has a convex curved wear surface.

7. The blade edge of claim 6 wherein each of the plurality of insert holes has a cylindrical configuration and an insert hole diameter slightly greater than the intermediate portion diameter.

8. The blade edge according to claim 3 wherein said plurality of insert holes are blind holes.

9. The blade edge according to claim 8 wherein the plurality of blade inserts are mounted within the plurality of insert holes by brazing.

10. The blade edge according to claim 9 wherein each of said plurality of blade inserts has an intermediate portion having an intermediate portion having a cylindrical configuration and which is mounted in said insert hole.

11. The blade edge according to claim 3 wherein said plurality of blade inserts are brazed into said plurality of insert holes.

12. The blade edge according to claim 3 wherein said plurality of blade inserts are mounted in said plurality of insert holes by press fitting.

13. A snowplow blade edge, for detachably mounting onto an elongated support member having a support member length, and to be used for removing snow from a surface, the blade edge comprising:

an edge body having an edge length, an edge height and an edge thickness, wherein the edge length is greater than the edge height and the edge thickness; wherein the edge length extends in the direction of the support member length when detachably mounted on the support member; said edge having a lower edge defined by said edge length and said edge thickness; and said lower edge having insert holes therein distributed all along the edge length;

a plurality of blade inserts each having a wear portion, the wear portion having a convex curved wear surface, the plurality of blade inserts being held by braze in said insert holes along the lower edge such that the wear portion will contact the surface from which snow is being removed;

wherein each of the plurality of blade inserts mounted along the lower edge is spaced apart so as to be in a non-contacting relationship with any other blade insert mounted along the lower edge.

14. The snowplow blade edge of claim 13 wherein the wear surface has a sphere section configuration.

15. The snowplow blade edge according to claim 13 wherein said plurality of blade inserts consists essentially of a cemented metal carbide.

16. A plow blade for removing snow from a surface, the plow blade comprising:

an elongated support member having a support member length;

a blade edge detachably mounted to the support member and said blade edge having a blade edge body with a blade edge length, a blade edge height and a blade edge thickness, wherein the blade edge length is greater than the blade edge height and the blade edge thickness; wherein the blade edge length extends in the direction of the support member length; said blade edge having a lower edge defined by said blade edge length and said blade edge thickness; and said lower blade edge having first and second insert holes therein distributed along the blade edge length;

first and second blade inserts, each having a wear portion and an intermediate portion, the wear portion having a convex curved wear surface, the intermediate portion having a cylindrical configuration adjoining the wear portion and a seating end adjoining the intermediate portion, the first and second blade inserts being brazed into the first and second insert holes along the lower edge such that the wear portion will contact the surface from which the snow is being removed.

17. A blade edge for detachably mounting onto an elongated support member having a support member length, the blade edge comprising:

an edge body having a blade edge length, a blade edge height and a blade edge thickness, wherein the blade edge length is greater than the blade edge height and the blade edge thickness; wherein the blade edge length extends in the direction of the support member length when detachably mounted on the support member; said blade edge having a lower edge defined by said blade edge length and said blade edge thickness; and said lower blade edge having a plurality of insert holes therein distributed along the blade edge length;

a plurality of blade inserts, having a wear portion and an intermediate portion and being mounted within the plurality of insert holes of the blade edge such that the wear portion protrudes to some extent from the plurality of insert holes, the intermediate portion having a cylindrical configuration adjoining the wear portion and a seating end adjoining the intermediate portion and;

wherein said plurality of blade inserts consist essentially of a cemented metal carbide.

18. A snowplow blade edge for detachably mounting onto an elongated support member having a support member length and to be used for removing snow from a surface, the blade edge comprising:

an edge body having an edge length, an edge height and an edge thickness, wherein the edge length is greater than the edge height and the edge thickness; wherein the edge length extends in the direction of the support member length when detachably mounted on the support member; said edge having a corner edge defined by said edge length and said edge thickness; and said lower edge having insert holes therein distributed all along the edge length;

a plurality of blade inserts each having a wear portion and an intermediate portion, the wear portion having a convex curved wear surface, the intermediate portion having a cylindrical configuration adjoining the wear portion and a seating end adjoining the intermediate portion and;

wherein said plurality of blade inserts being held by braze in said insert holes along the lower edge such that the wear portion will contact the surface from which the snow is being removed.

19. The snowplow blade edge according to claim 18 wherein said plurality of blade inserts consist essentially of a cemented metal carbide.

20. The snowplow blade edge according to claim 19 wherein said plurality of insert holes are blind holes.

* * * * *